H. FLATTEM.
RELIEF TRAP DOOR FOR GRAIN CARS.
APPLICATION FILED JUNE 6, 1917.
1,256,544.
Patented Feb. 19, 1918.
3 SHEETS—SHEET 2.
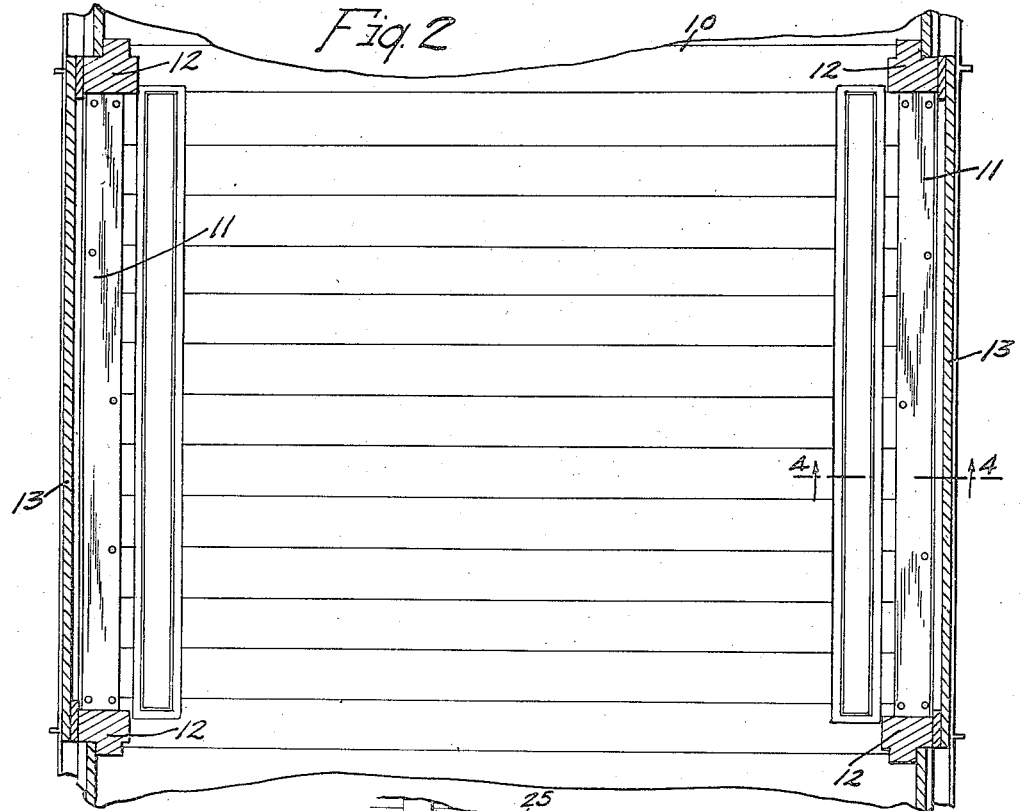
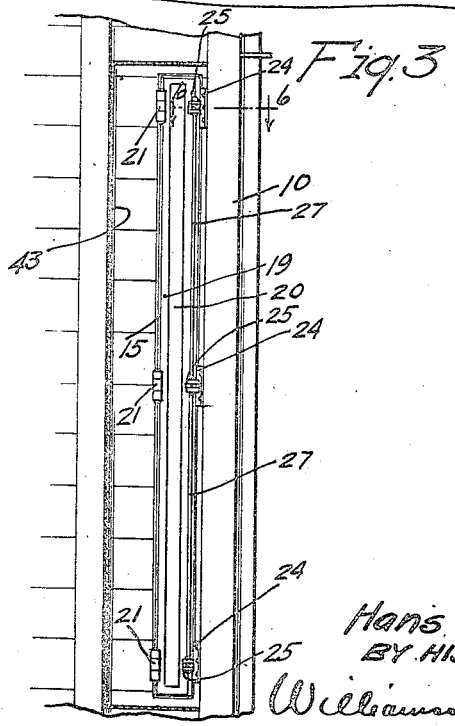
WITNESSES
E. G. Wells
A. H. Opsahl
INVENTOR
Hans Flattem
BY HIS ATTORNEYS
Williamson Merchant

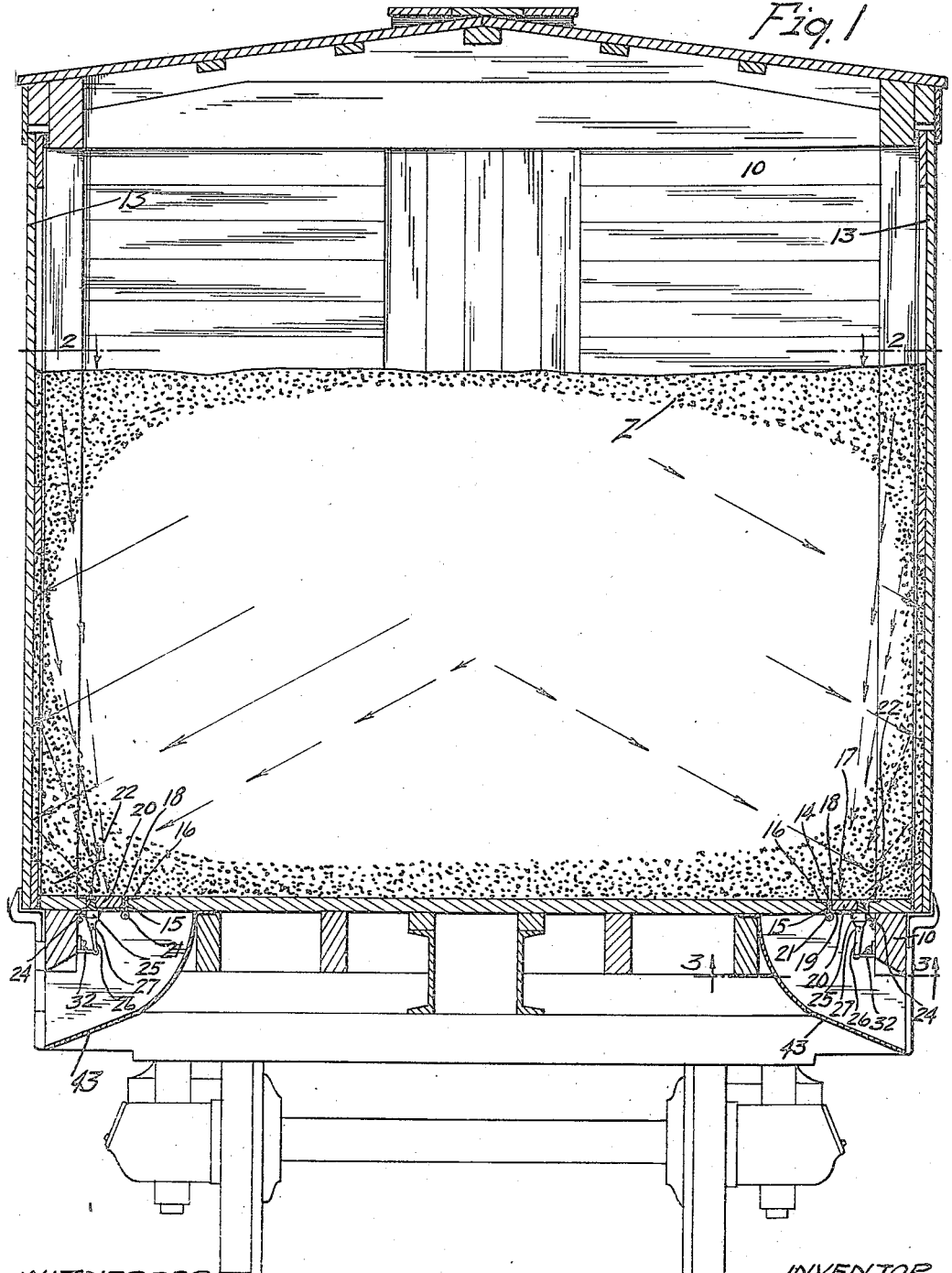

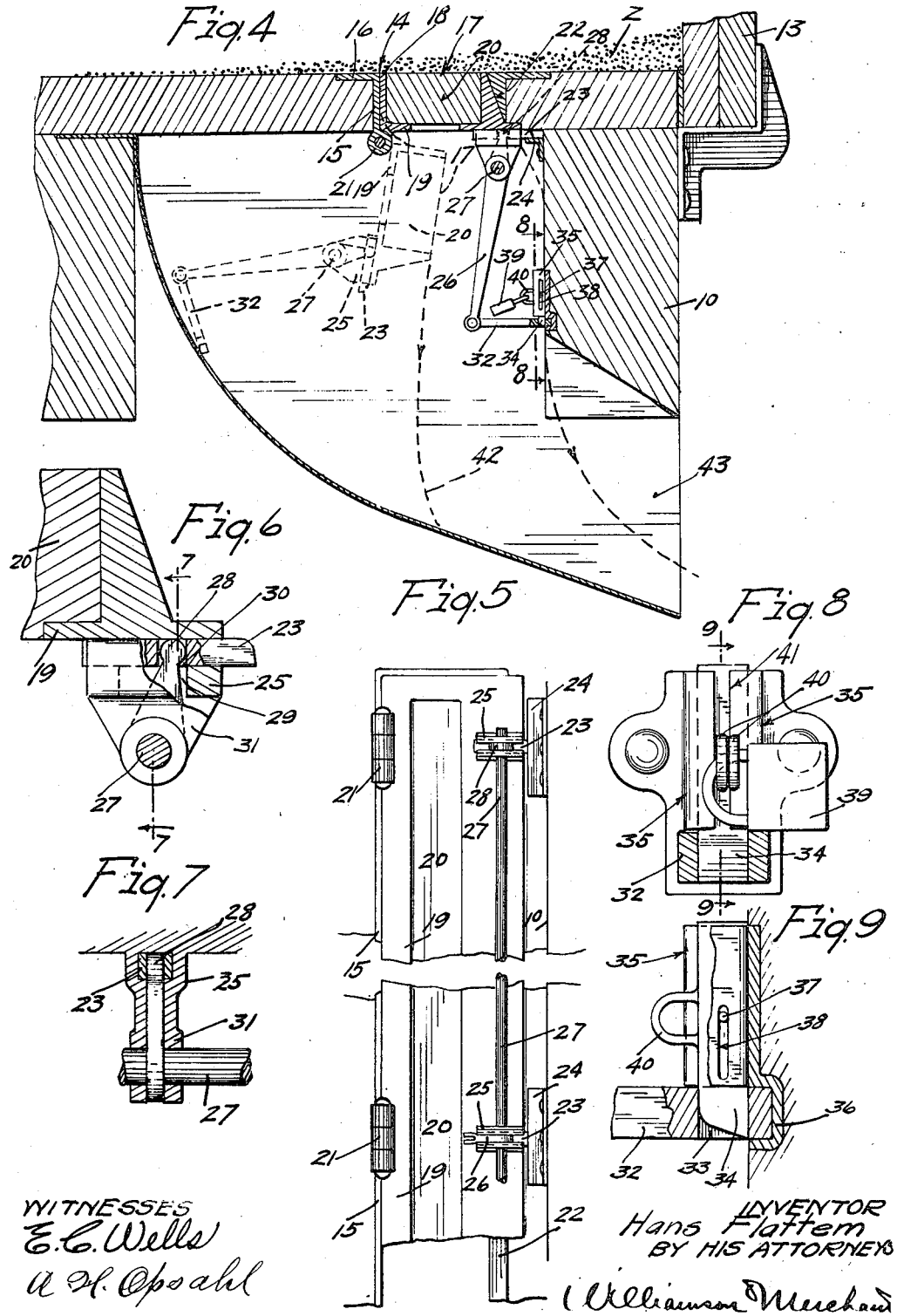

UNITED STATES PATENT OFFICE.

HANS FLATTEM, OF MINNEAPOLIS, MINNESOTA.

RELIEF TRAP-DOOR FOR GRAIN-CARS.

1,256,544.  Specification of Letters Patent. Patented Feb. 19, 1918.

Application filed June 6, 1917. Serial No. 173,100.

*To all whom it may concern:*

Be it known that I, HANS FLATTEM, a citizen of the United States, residing at Minneapolis, in the county of Hennepin and State of Minnesota, have invented certain new and useful Improvements in Relief Trap-Doors for Grain-Cars; and I do hereby declare the following to be a full, clear, and exact description of the invention, such as will enable others skilled in the art to which is appertains to make and use the same.

My invention relates to relief trap doors for grain cars; and, to this end, it consists of the novel devices and combinations of devices hereinafter described and defined in the claims.

In the accompanying drawings, which illustrate the invention, like characters indicate like parts throughout the several views.

Referring to the drawings,

Figure 1 is a view of a box or grain car in transverse vertical section loaded with grain and having the invention incorporated therein;

Fig. 2 is a fragmentary horizontal section taken on the line 2—2 of Fig. 1;

Fig. 3 is a fragmentary bottom plan view, with some parts sectioned on the line 3—3 of Fig. 1;

Fig. 4 is a detail view in section taken on the line 4—4 of Fig. 2, on an enlarged scale, with some parts shown in different positions by means of broken lines;

Fig. 5 is a fragmentary bottom plan view of one of the trap doors and associated parts of the car body;

Fig. 6 is a detail view, principally in section taken on the line 6—6 of Fig. 3;

Fig. 7 is a detail view, with some parts sectioned on the irregular line 7—7 of Fig. 6;

Fig. 8 is a detail view, with some parts sectioned on the line 8—8 of Fig. 4, on an enlarged scale; and Fig. 9 is a detail view, with some parts sectioned on the line 9—9 of Fig. 8.

The numeral 10 indicates the body of a standard box or grain car, having in each of its sides the customary door opening 11, located between door posts 12 and provided with a sliding door 13. Formed in the floor of the car body 10, just inside of each door opening 11, is a narrow grain relief opening 14, which extends the full distance between the respective door post 12. Each of these openings 14 has fitted therein a marginal metallic frame 15, having a horizontal outturned flange 16, which rests on the floor of the car body 10 and supports said frame therefrom. The flanges 16 are set into the floor of the car body 10, so that they are flush therewith.

Each grain relief opening 14 is normally closed by a trap door 17 comprising a marginal metallic frame 18, having at its lower edge an inturned flange 19 on which is supported a wooden panel 20. The doors 17 are hinged at 21 to the lower inner longitudinal edges of the frames 15 for swinging movement under the floor of the car body 10. On account of the thickness of the doors 17, their free longitudinal edges have beveled engagement at 22 with the frames 15, so that they may be tightly fitted therein and, at the same time, have free opening and closing movements.

Each trap door 17 is held closed by a plurality of sliding lock bolts 23, as shown three, and coöperating fixed angle lock bars 24. The lock bolts 23 are mounted in casings 25 integrally formed with the frames 18 of the doors 17 and the lock bars 24 have their vertical flanges turned downward and rigidly secured to the inner faces of the outside sills of the car body 10. The horizontal flanges of the lock bars 24 are turned inward to permit the lock bolts 23 to rest thereon, when in operative positions, and thereby hold the trap doors 17 closed.

Each set of lock bolts 23 are simultaneously operated by a depending lever 26 rigidly secured to a rock shaft 27, having a plurality of upwardly projecting arms 28 which work in slots 29 formed in the casings 25 with their free ends mounted in seats 30 formed in the lock bolts 23. The rock shaft 27 is journaled in laterally spaced pairs of depending bearings 31 integrally formed with the casings 25. The arms 28 are located between the pairs of bearings 31 and, as shown, the intermediate arm is integrally formed with the lever 26.

Pivoted to the lower end of the lever 26 for vertical swinging movement, is a link 32, having in its free end an aperture 33 adapted to receive a lock bolt 34 mounted in a casing 35 secured to the inner face of the adjacent outside sill of the car body 10 and provided with a socket 36 in which the free end of the link 32 is seated, when held by the lock bolt 34. Obviously, this socket 36 holds the link 32 against vertical swinging movement and the lock bolt 34 holds the same against endwise removal therefrom. To prevent the lock bolt 34 from dropping out of the casing 35, the same is provided with a transverse pin 37, which works in slots 38 formed in the sides of the casing 35.

The lock bolt 34 is, as shown, secured in an operative position by a padlock 39, the yoke of which is passed through a pair of alined eyes 40 integrally formed, the one with said lock bolt and the other with the casing 35. The eye 40 on the lock bolt 34 works in a slot 41, which extends completely through said casing. In place of the padlock 39, an ordinary car seal may be used. To open one of the trap doors 17, the respective padlock 40 is removed and the lock bolt 34 raised to release the link 32. Then by moving the lever 26 outward, the arms 28 simultaneously impart a movement to the lock bolt 23 and withdraw the same from engagement with the lock bars 24. The weight of the door 17 and the load thereon will swing said door open, as indicated by broken lines in Fig. 4. The flow of the grain Z from the car body 10 through the relief openings 14, is indicated by the broken lines 42, and to direct these streams of grain outward of the sides of the car body, sheet metal spouts 43 are secured to said body.

From the above description, it is evident that by opening the relief door 17, the grain in the car body 10, bearing against the car doors 13, will be discharged therethrough in the direction of the arrows indicated in Fig. 1, thus relieving the pressure on said doors 13, so that they may be easily opened.

What I claim is:—

1. The combination with a car body having a grain relief opening in the floor thereof, of a trap door for said relief opening, and a spout arranged to deflect the grain discharged through the relief opening to one side of the car body, said trap door being hinged to the car body for swinging movement therebelow and into the spout.

2. The combination with a car body having a door opening and a door therefor, of a grain relief opening in the floor of the body at the door opening, a metal frame in said relief opening with an outturned flange resting on the floor of the car body and supporting said frame therefrom, and a trap door comprising a metal marginal frame with an outturned flange supporting a wooden panel, the frame of said door being fitted within the frame of said relief opening and hinged thereto for swinging movement below the car body.

3. The combination with a car body having a door opening and a door therefor, of a grain relief opening in the floor of the car body at the door opening, a trap door for the relief opening hinged for swinging movement below the floor of the car body, a lock bolt for holding the trap door closed, a lever for operating said latch bolt, and means for locking said lever in a position to hold the lock bolt in an operative position.

4. The combination with a car body having a door opening and a door therefor, of a grain relief opening in the floor of the car body at the door opening, a trap door for the relief opening hinged for swinging movement below the floor of the car body, a lock bolt for holding the trap door closed, an intermediately fulcrumed lever having its short end connected to the lock bolt, a link pivoted to the long end of said lever, a socket member for receiving the free end of said link to hold said lever with said lock bolt in an operative position, and a lock for holding said link in said socket member.

5. The combination with a car body having a door opening and a door therefor, of a grain relief opening in the floor of the car body at the door opening, a trap door for the relief opening hinged for swinging movement below the floor of the car body, a plurality of lock bolts for holding the trap door closed, a rock shaft having a plurality of arms connected to said lock bolt for simultaneously operating the same, a lever for oscillating the rock shaft, and a lock for said lever.

6. The combination with a car body having a door opening and a door therefor, of a grain relief opening in the floor of the car body at the door opening, a trap door for the relief opening hinged for swinging movement below the floor of the car body, a plurality of lock bolts for holding the trap door closed, a rock shaft having a plurality of arms connected to said lock bolt for simultaneously operating the same, a lever for oscillating the rock shaft, a link pivoted to said lever, a socket member for receiving the free end of said link to hold the lever with the lock bolt in an operative position, and a lock for holding the link in the socket member.

In testimony whereof I affix my signature in presence of two witnesses.

HANS FLATTEM.

Witnesses:
   Eva E. König,
   Harry D. Kilgore.